United States Patent
Schmidl et al.

(10) Patent No.: US 6,973,117 B1
(45) Date of Patent: Dec. 6, 2005

(54) DYNAMIC EXTENSION OF FREQUENCY HOPPING PATTERNS IN WIRELESS COMMUNICATIONS

(75) Inventors: Timothy M. Schmidl, Dallas, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 698 days.

(21) Appl. No.: 09/634,473

(22) Filed: Aug. 8, 2000

Related U.S. Application Data

(60) Provisional application No. 60/185,936, filed on Feb. 29, 2000.

(51) Int. Cl.[7] .................................. H04B 1/713
(52) U.S. Cl. .................. 375/132; 455/464; 370/329
(58) Field of Search .................. 375/132, 135, 375/219, 322; 370/278, 329; 455/464, 501

(56) References Cited

U.S. PATENT DOCUMENTS

| | | | |
|---|---|---|---|
| 5,323,447 A * | 6/1994 | Gillis et al. ................. | 455/464 |
| 6,128,327 A * | 10/2000 | Bird et al. ................... | 375/132 |
| 6,327,300 B1 * | 12/2001 | Souissi et al. .............. | 375/219 |
| 6,549,784 B1 * | 4/2003 | Kostic et al. ............... | 455/501 |

OTHER PUBLICATIONS

"Networks for Homes", Amitava Dutta-Roy, IEE Spectrum, Dec. 1999, pp. 26-33.

* cited by examiner

*Primary Examiner*—Young T. Tse
*Assistant Examiner*—Edith Chang
(74) *Attorney, Agent, or Firm*—Ronald O. Neerings; Wade James Brady, III; Frederick J. Telecky, Jr.

(57) ABSTRACT

In a duplex link (40, 60, 90, 116) coupling first and second frequency hopping wireless communication devices, either or both of the frequency hopping patterns that are respectively used in the downlink and the uplink can be selectively and dynamically extended. Extension of the frequency hopping pattern associated with the uplink (55, 74) can compensate for a power imbalance between the uplink and the downlink by improving the gain of the uplink. By extending the frequency hopping pattern associated with the downlink (106, 129), strong interfering frequencies that would otherwise interfere with many downlink frequencies can be avoided.

26 Claims, 6 Drawing Sheets

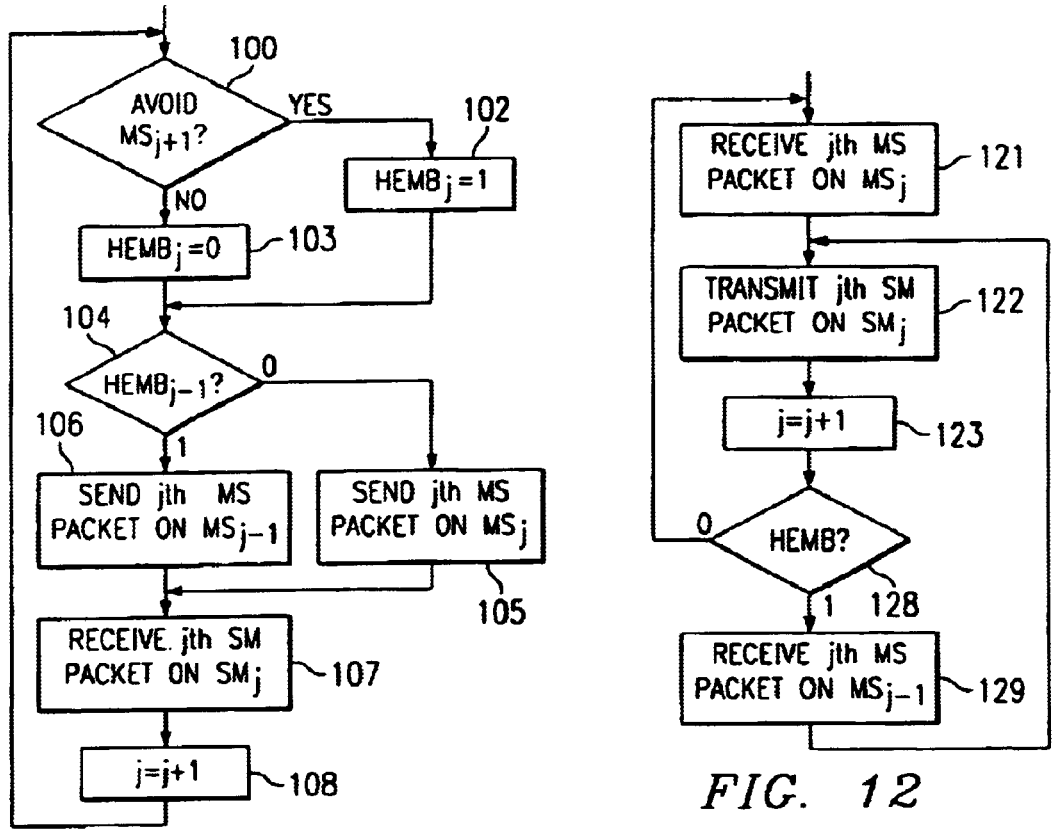
FIG. 10
FIG. 12
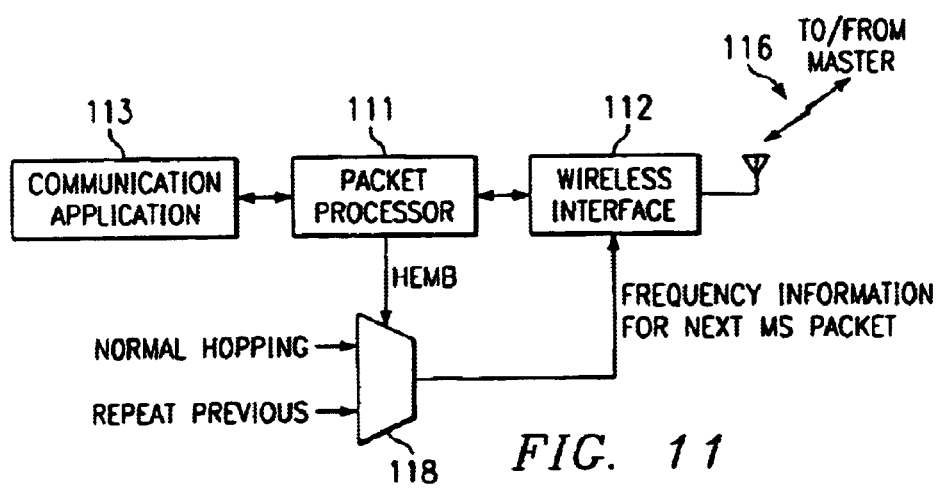
FIG. 11

DYNAMIC EXTENSION OF FREQUENCY HOPPING PATTERNS IN WIRELESS COMMUNICATIONS

This application claims the priority under 35 U.S.C. 119(e)(1) of copending U.S. provisional application No. 60/185,936, filed on Feb. 29, 2000.

CROSS REFERENCE TO RELATED APPLICATION

This application contains subject matter that is related to subject matter in copending U.S. Ser. No. 09/507,134 filed on Feb. 22, 2000, incorporated herein by reference.

FIELD OF THE INVENTION

The invention relates generally to wireless communications and, more particularly, to wireless communications that employ frequency hopping techniques.

BACKGROUND OF THE INVENTION

Present telecommunication system technology includes a wide variety of wireless networking systems associated with both voice and data communications. An overview of several of these wireless networking systems is presented by Amitava Dutta-Roy, *Communications Networks for Homes*, IEEE Spectrum, pg. 26, December 1999. Therein, Dutta-Roy discusses several communication protocols in the 2.4 GHz band, including IEEE 802.11 direct-sequence spread spectrum (DSSS) and frequency-hopping (FHSS) protocols. A disadvantage of these protocols is the high overhead associated with their implementation. A less complex wireless protocol known as Shared Wireless Access Protocol (SWAP) also operates in the 2.4 GHz band. This protocol has been developed by the HomeRF Working Group and is supported by North American communications companies. The SWAP protocol uses frequency-hopping spread spectrum technology to produce a data rate of 1 Mb/sec. Another less complex protocol is named Bluetooth after a $10^{th}$ century Scandinavian king who united several Danish kingdoms. This protocol also operates in the 2.4 GHz band and advantageously offers short-range wireless communication between Bluetooth devices without the need for a central network.

The Bluetooth protocol provides a 1 Mb/sec data rate with low energy consumption for battery powered devices operating in the 2.4 GHz ISM (industrial, scientific, medical) band. The current Bluetooth protocol provides a 10-meter range and an asymmetric data transfer rate of 721 kb/sec. The protocol supports a maximum of three voice channels for synchronous, CVSD-encoded transmission at 64 kb/sec. The Bluetooth protocol treats all radios as peer units except for a unique 48-bit address. At the start of any connection, the initiating unit is a temporary master. This temporary assignment, however, may change after initial communications are established. Each master may have active connections of up to seven slaves. Such a connection between a master and one or more slaves forms a "piconet." Link management allows communication between piconets, thereby forming "scatternets." Typical Bluetooth master devices include cordless phone base stations, local area network (LAN) access points, laptop computers, or bridges to other networks. Bluetooth slave devices may include cordless handsets, cell phones, headsets, personal digital assistants, digital cameras, or computer peripherals such as printers, scanners, fax machines and other devices.

The Bluetooth protocol uses time-division duplex (TDD) to support bi-directional communication. Spread-spectrum technology or frequency diversity with frequency hopping permits operation in noisy environments and permits multiple piconets to exist in close proximity. The frequency hopping scheme permits up to 1600 hops per second over 79 1-MHZ channels or the entire ISM spectrum. Various error correcting schemes permit data packet protection by ⅓ and ⅔ rate forward error correction. Further, Bluetooth uses retransmission of packets for guaranteed reliability. These schemes help correct data errors, but at the expense of throughput.

The Bluetooth protocol is specified in detail in *Specification of the Bluetooth System*, Version 1.0A, Jul. 26, 1999, which is incorporated herein by reference.

In many Bluetooth applications, it is desirable to improve the slave-to-master link. For example, in a cordless phone application, the base unit (master) can be plugged into a power outlet, so a 20 dBm power amplifier can be used, while the cordless phone (slave) itself must rely on battery power and therefore can only transmit at about 0 dBm. Such a power imbalance can be disadvantageous, because the slave-to-master link can be expected to have a higher error rate than the master-to-slave link, thereby increasing the likelihood that communications between the master and the slave will fail prematurely.

It is therefore desirable to provide suitable gains in the slave-to-master link in order to balance the duplex link between the slave and the master.

Another problem that is commonly encountered in Bluetooth applications is the presence of a strong interferer, for example a microwave oven. In many conventional applications, microwave oven interference can make as many as 10 frequencies unusable half of the time.

It is therefore desirable to provide capabilities for avoiding strong interferers.

In wireless communications according to the present invention, either or both of the frequency hopping patterns that are respectively used in a master-to-slave link (downlink) and a slave-to-master link (uplink) can be selectively and dynamically extended. Extension of the slave-to-master frequency hopping pattern can advantageously compensate for a power imbalance between the links by improving the gain of the slave-to-master link. Strong interfering frequencies can be advantageously avoided by extending the master-to-slave frequency hopping pattern.

BRIEF DESCRIPTION OF THE DRAWINGS

FIG. 10 illustrates exemplary operations which can be performed by the master device of FIG. 9.

FIG. 11 diagrammatically illustrates exemplary embodiments of the slave device of FIG. 8.

FIG. 12 illustrates exemplary operations which can be performed by the slave device of FIG. 11.

DETAILED DESCRIPTION

Figure 1:
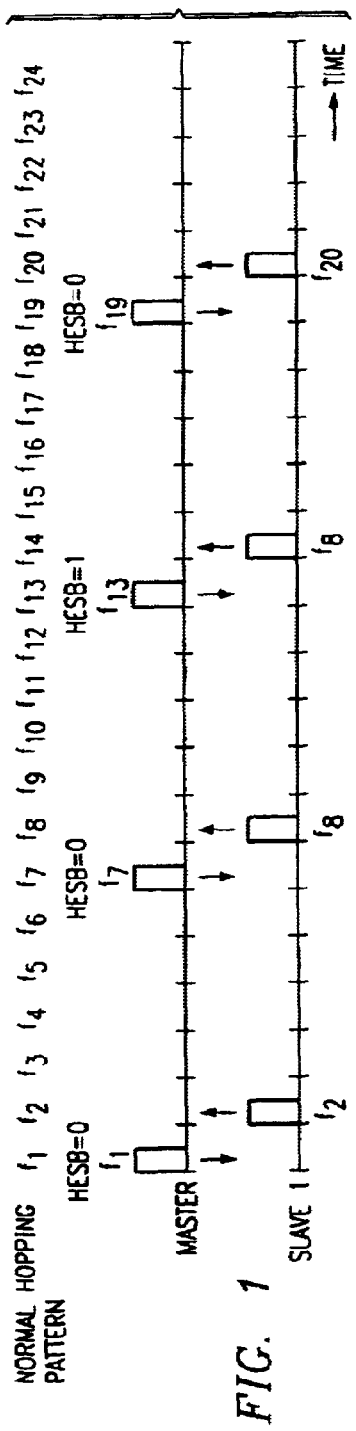
FIG. 1 diagrammatically illustrates an example of extending the frequency hopping pattern of a slave-to-master link according to the invention.

According to the present invention, gains on the slave-to-master link can be achieved by extending the frequency hopping pattern in the slave-to-master link when channel conditions are favorable. Such an extension of the frequency hopping pattern of the slave-to-master link is also herein referred to as HES (hop extension for slave). The frequency hopping pattern of the slave-to-master link can be extended according to the present invention by commanding the slave to transmit its current packet to the master using the same frequency that the slave used to transmit the immediately preceding packet to the master. FIG. 1 diagrammatically illustrates one example of the above-described operation. In HES operation, the frequency hopping pattern of the master-to-slave link remains unchanged, retaining the conventional master-to-slave frequency hopping pattern (e.g., the Bluetooth frequency hopping pattern).

In the example of FIG. 1, the master transmits to the slave a hopping extension for slave bit (HESB) indicative of the frequency that the slave should use to transmit the next slave-to-master packet. If HESB=0, then the slave simply uses the frequency specified by its normal frequency hopping pattern. However, if the master transmits HESB=1, this commands the slave to transmit the next packet on the same frequency that was used to transmit the immediately preceding slave-to-master packet. In particular, in response to transmission by the master of HESB=1 on frequency $f_{13}$, the slave transmits its current packet to the master on the same frequency that it used to transmit its previous packet, namely frequency $f_8$, rather than frequency $f_{14}$ of the slave's normal frequency hopping pattern. Thereafter, in its next transmission on frequency $f_{19}$, the master transmits HESB=0, which the slave responds to by transmitting its current packet on the frequency $f_{20}$ dictated by the normal frequency hopping pattern. The master's decision to transmit HESB=1 and thereby command the slave to repeat its immediately preceding frequency can be based, for example, on a channel quality measurement, such as a measurement that indicates that frequency $f_8$ has a high $E_b/(N_O+I_O)$ or a high RSSI (received signal strength indicator).

In low Doppler environments, the master can use one or more conventional techniques to keep track of the quality of the channel from each slave for all of the frequencies, so the master will know which frequencies are currently in a fade for each user (i.e., each slave). The master can then instruct the slave to use the frequencies that are not in a fade. In higher Doppler environments, the master can direct the slave to use normal hopping frequencies until a good frequency is encountered, at which time the master can instruct the slave to continue to use this good frequency until it starts to fade. The master can detect a fading frequency by monitoring conventionally available information. For example, a lowered sync word correlation or an increase in packet errors can be indicative of a fading frequency in a Bluetooth system.

Figure 2:
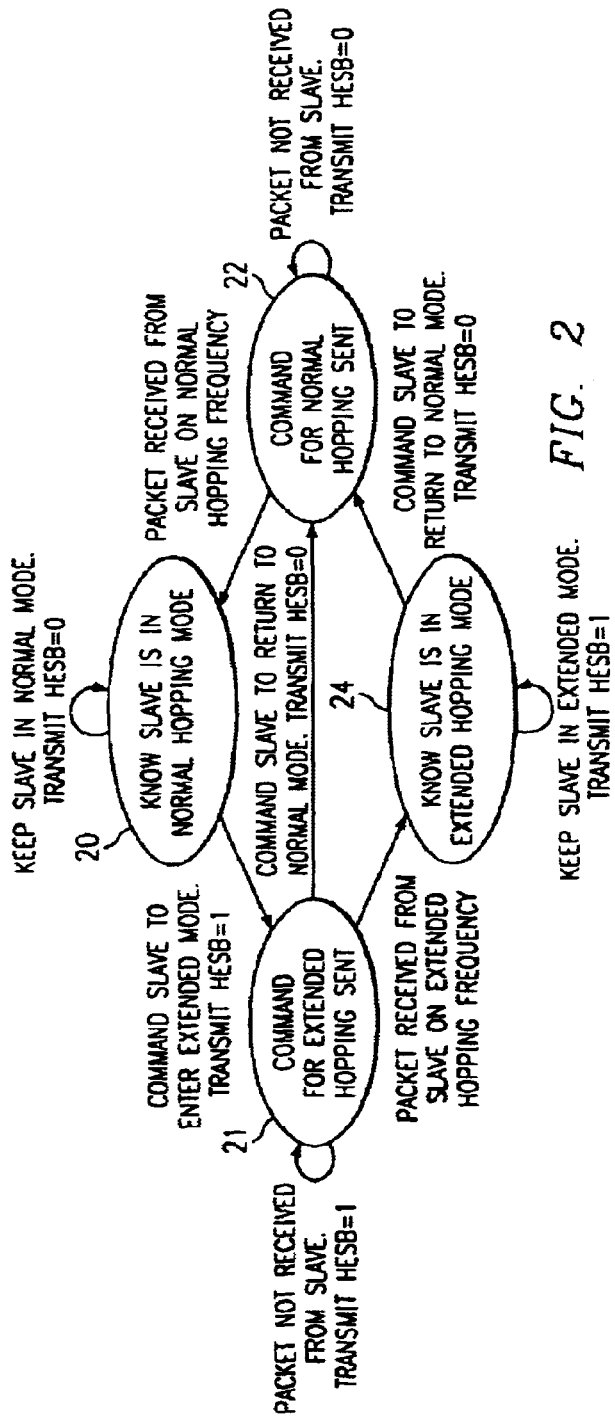
FIG. 2 diagrammatically illustrates an exemplary state diagram of the master device of FIG. 1.

FIG. 2 diagrammatically illustrates an exemplary state transition diagram for the master device illustrated in FIG. 1. Because the master uses its normal frequency hopping pattern, the slave will always know the hopping frequency that the master is using. However, if one or more packets from the master to the slave or from the slave to the master are lost, the master may not know the state of the slave for one or more transmissions. This uncertainty as to the state of the slave is illustrated by the transition states 21 and 22 in FIG. 2. When the master transmits HESB=1 to the slave, the master transitions from the state 20, namely knowing that the slave is in its normal frequency hopping mode, into the transition state 21 of FIG. 2. If the master receives a packet from the slave on the extended hopping frequency, for example frequency $f_8$ of FIG. 1, then the master transitions into state 24, namely knowing that the slave is in the extended hopping mode.

On the other hand, if no packet is received from the slave on the extended hopping frequency, the master remains in the transition state 21 and continues transmitting HESB=1 until a packet is received from the slave on the extended hopping frequency, or until a suitable timeout period has expired. Upon expiration of the timeout period, the master transmits HESB=0, thereby transitioning from transition state 21 to transition state 22. In transition state 22, the master continues to transmit HESB=0 until a packet is received from the slave on the normal hopping frequency, at which time the master transitions from state 22 back to state 20. Referring again to state 24, the master can continue transmitting HESB=1 for as long as it is desired to keep the slave in the extended hopping mode. When it is desired to return to the normal hopping mode, the master transmits HESB=0 to the slave, whereupon the master transitions from state 24 into transition state 22.

Figure 3:
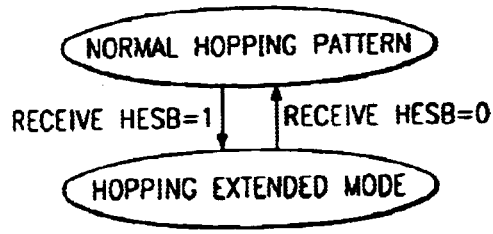
FIG. 3 diagrammatically illustrates an exemplary state diagram of the slave device of FIG. 1.

FIG. 3 illustrates an exemplary state diagram for the slave of FIG. 1. As shown in FIG. 3, the slave remains in its normal frequency hopping pattern state until it receives HESB=1 from the master, whereupon the slave transitions from the normal frequency hopping state into the extended frequency hopping state. The slave remains in the extended frequency hopping state until it receives HESB=0 from the master, whereupon the slave transitions from the extended hopping state back to the normal hopping state.

Figure 4:
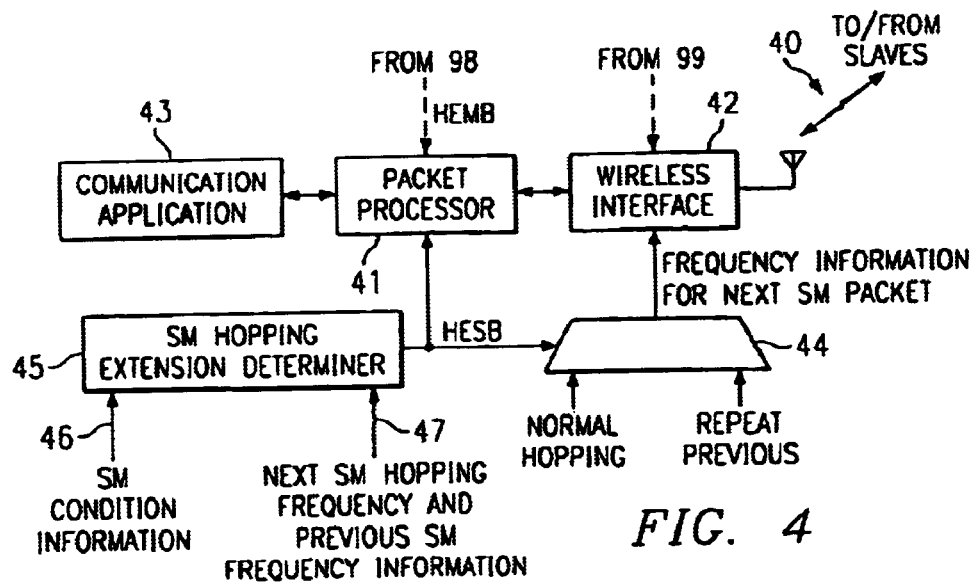
FIG. 4 diagrammatically illustrates exemplary embodiments of the master device of FIG. 1.

FIG. 4 diagrammatically illustrates pertinent portions of exemplary embodiments of the master device of FIG. 1. The master device of FIG. 4 could be provided, for example, in the base unit of a Bluetooth cordless phone system. Other examples of the master device are mentioned above. The master device of FIG. 4 includes a packet processor 41 coupled for communication with a wireless communications interface 42 and a communications application 43. The packet processor 41 receives communication information from the communications application 43, and assembles this communication information into packets. The packet processor 41 then forwards the assembled packets to the wireless communications interface 42 for transmission to one or more slave devices (e.g., Bluetooth cordless phones) by signaling over a wireless communication link 40, for example a Bluetooth radio link. Similarly, the wireless interface 42 receives packets from one or more slave devices via the wireless communication link 40. The wireless interface forwards the received packets to the packet processor 41, which disassembles the received packets and forwards them to the communications application 43. The above-described operations of the packet processor 41 and wireless communications interface 42 are conventional operations that are well known in the art.

According to the present invention, the packet processor 41 inserts the bit HESB in the outgoing packets of the master-to-slave link. In FIG. 4, the value of HESB is determined by a slave-to-master (SM) hop extension determiner 45 whose function is to determine whether or not the frequency hopping pattern of the slave-to-master link should be extended. If the SM hop extension determiner 45 determines that the frequency hopping pattern of the slave-to-master link should be extended, then the determiner 45 outputs a value of HESB=1. Otherwise, the determiner 45 outputs a value of HESB=0. In addition to being provided in the outgoing packets on the master-to-slave link, HESB is also used to control a selector 44 whose output provides to the wireless interface 42 frequency information for the next slave-to-master packet. If HESB=0, then selector 44 indicates to the wireless interface 42 that the next slave-to-master packet is to be transmitted on the normal frequency hop. On the other hand, if HESB-1, then the selector 44 indicates to the wireless interface 42 that the frequency used to transmit the previous slave-to-master packet will be repeated for transmission of the next slave-to-master packet. The selector 44 thus serves as an indicator of the frequency that will be used for transmission of the next slave-to-master packet.

The SM hop extension determiner 45 determines the value of HESB in response to an input 46, which receives information indicative of the condition of the slave-to-master link. As mentioned above, examples of this information include conventionally available channel quality measurement information, conventionally available sync word correlation information and conventionally available packet error information. The information received at 46 is considered by the determiner 45 along with information (received at an input 47) indicative of both the next frequency of the normal SM frequency hopping pattern and the previous frequency at which the immediately preceding SM packet was transmitted. The determiner 45 determines from the condition information at 46 whether the next hop frequency in the normal frequency hopping pattern is more or less desirable than the previous frequency at which the immediately preceding SM packet was transmitted. If the next frequency hop is more desirable, then the determiner 45 outputs HESB=0, but if the previous SM transmit frequency is more desirable, then the determiner 45 outputs HESB=1. In one exemplary embodiment, if the condition information at 46 indicates that the previous SM transmit frequency has a higher $E_b/(N_O+I_O)$ than does the next frequency in the normal hopping pattern, then the determiner 45 outputs HESB=1, and otherwise outputs HESB=0. The condition information at 46 may also indicate the presence of a strong interferer, (for example a microwave oven or an IEEE 802.11b interferer) at the next frequency.

Figure 5:
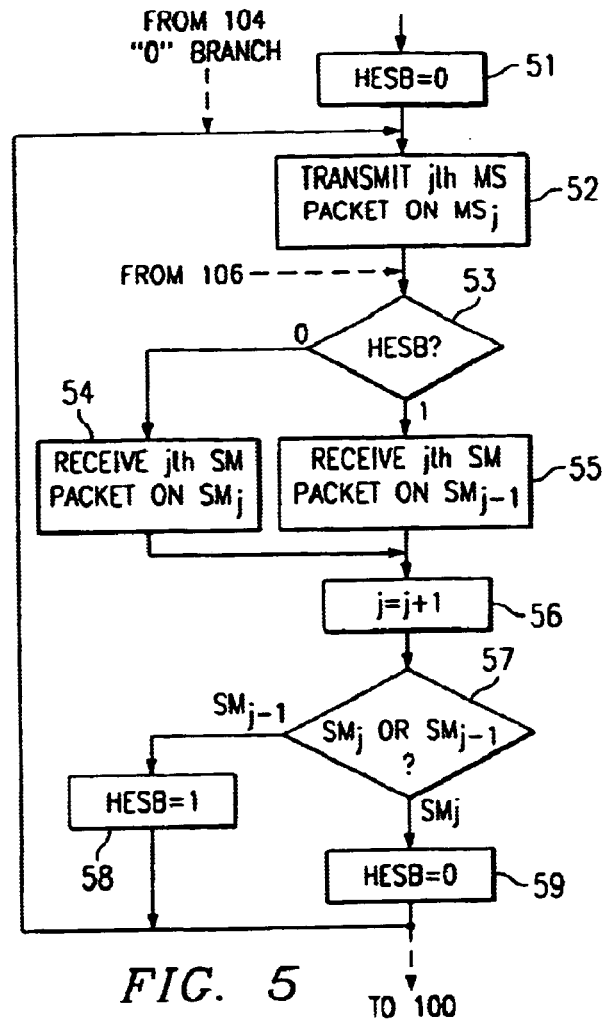
FIG. 5 illustrates exemplary operations which can be performed by the master device of FIG. 4.

FIG. 5 illustrates exemplary operations which can be performed by the master device of FIG. 4. After initially setting HESB=0 at 51, the jth master-to-slave packet (including HESB) is transmitted at 52 on the normal hopping frequency for the jth packet on the master-to-slave link, which frequency is designated in FIG. 5 as $MS_j$. Thereafter, if HESB=0 at 53, then the jth slave-to-master packet is received at 54 on the normal hopping frequency for the jth packet of the slave-to-master link, which frequency is designated as $SM_j$ in FIG. 5. If IESB=1 at 53, then the jth slave-to-master packet is received at 55 on the frequency $SM_{j-1}$, namely the frequency that was used in the immediately preceding (j–1)th slave-to-master transmission. After the jth SM packet is received at 54 or 55, the index j is incremented at 56, and it is then determined at 57 whether $SM_j$ (the normal hopping frequency for the jth SM packet) or $SM_{j-1}$ (the frequency that was used for the (j–1)th SM packet) is more desirable. If the frequency $SM_{j-1}$ is more desirable, then HESB is set to 1 at 58. On the other hand, if the normal hopping frequency $SM_j$ is more desirable at 57, then HESB is set to 0 at 59. After HESB is determined at 58 or 59, the above-described operations at 52–59 are repeated.

Figure 6:
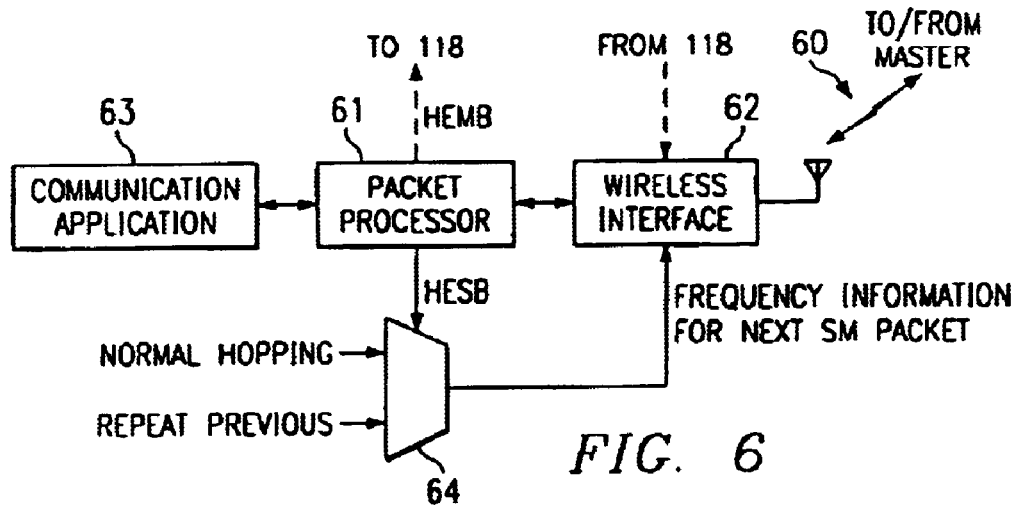
FIG. 6 diagrammatically illustrates exemplary embodiments of the slave device of FIG. 1.

FIG. 6 diagrammatically illustrates pertinent portions of exemplary embodiments of the slave device illustrated in FIG. 1. The slave device of FIG. 6 could be provided, for example, in a mobile phone unit of a Bluetooth cordless phone system. Other examples of the slave device are mentioned above. The slave device of FIG. 6 includes a packet processor 61 coupled between a wireless communications interface 62 and a communications application 63, similar to the arrangement at 41–43 in the master device of FIG. 4. The components 61–63 of FIG. 6 can cooperate together using the well known conventional operations mentioned above with respect to FIG. 4 to permit the slave device of FIG. 6 to engage in bidirectional wireless packet communication with a master device (such as shown in FIG. 4) via a suitable wireless communication link 60.

When disassembling the packets received from the wireless interface 62, the packet processor 61 provides the bit HESB to a selector 64 whose output provides to the wireless interface 62 information indicative of the frequency for the next slave-to-master packet. If HESB=0, then the selector 64 indicates to the wireless interface 62 that the frequency for the next slave-to-master packet will be the normal hop frequency from the slave-to-master frequency hopping pattern. On the other hand, if HESB=1, then the selector 64 indicates to the wireless interface 62 that the previous frequency used to transmit the immediately preceding slave-to-master packet is to be repeated for transmission of the next slave-to-master packet. The selector 64 thus serves as an indicator of the frequency that will be used for transmission of the next slave-to-master packet.

Figure 7:
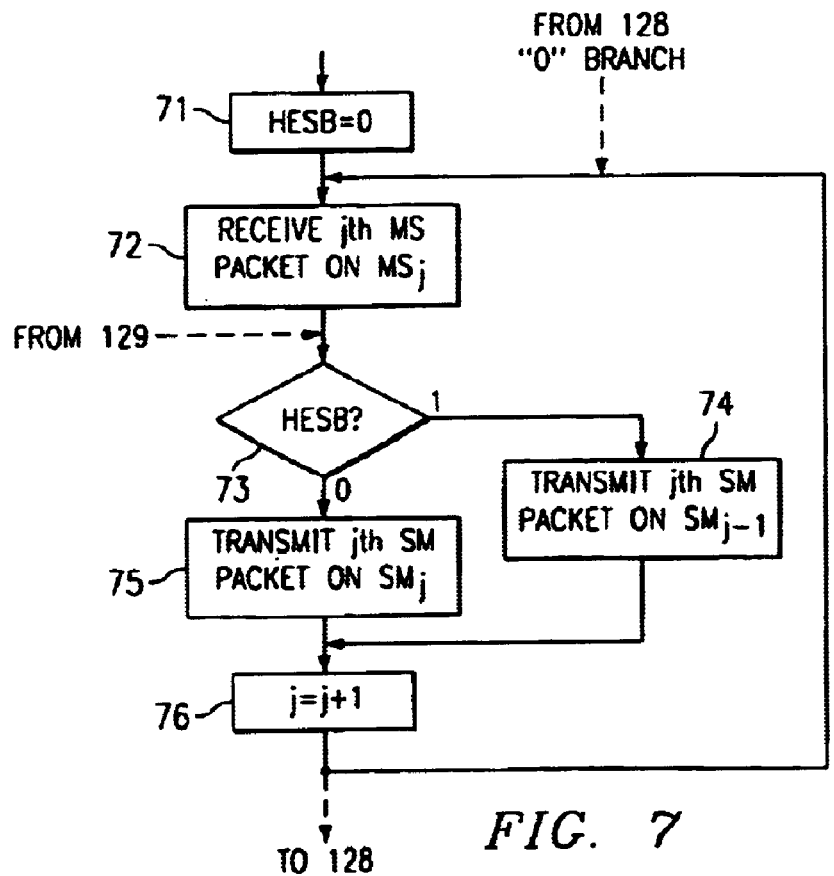
FIG. 7 illustrates exemplary operations which can be performed by the slave device of FIG. 6.

FIG. 7 illustrates exemplary operations which can be performed by the slave device of FIG. 6. After initially setting HESB=0 at 71, the jth master-to-slave packet is received at 72 on frequency $MS_j$. Thereafter, if HESB=1 at 73, the jth slave-to-master packet is transmitted at 74 on frequency $SM_{j-1}$. Otherwise, if HESB=0 at 73, then the jth slave-to-master packet is transmitted at 75 on frequency $SM_j$. After the jth slave-to-master packet has been transmitted at 74 or 75, the index j is incremented at 76, and the above-described operations at 72–75 are repeated.

Figure 8:
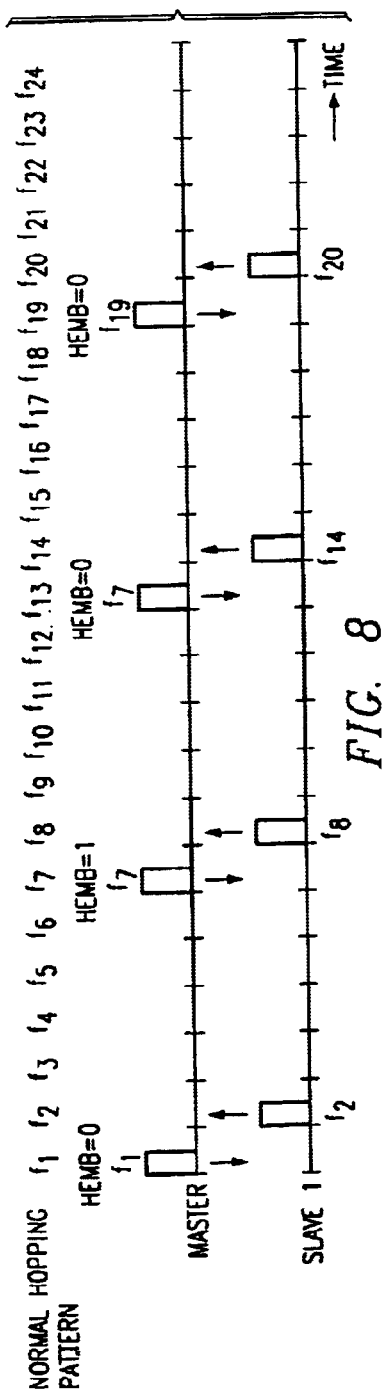
FIG. 8 diagrammatically illustrates an extension of the frequency hopping pattern of a master-to-slave link according to the present invention.

FIG. 8 diagrammatically illustrates an example of extending the frequency hopping pattern of a master-to-slave link according to the present invention. This hop extension for the master, also designated herein as HEM, can be advantageous in the presence of a strong interferer, for example a microwave oven. As shown in FIG. 8, the master transmits a hop extension for master bit (HEMB) which is indicative of the frequency that the master will use in its next transmission. If the master transmits HEMB=0, then the frequency of the master's next transmission will be the normal hopping frequency from its normal hopping frequency pattern. On the other hand, if the master transmits HEMB=1, this indicates that the master will repeat the frequency of the current transmission in its next transmission. In the example of FIG. 8, when the master is transmitting on frequency $f_7$, it knows that there will be interference on the next frequency $f_{13}$ in its normal hopping pattern, so the master transmits HEMB=1, thereby indicating to the slave that the current frequency $f_7$ will be used for the next master-to-slave transmission instead of frequency $f_{13}$ from the normal frequency hopping pattern. In this manner, the master can avoid a strong interferer on frequency $f_{13}$.

Figure 9:
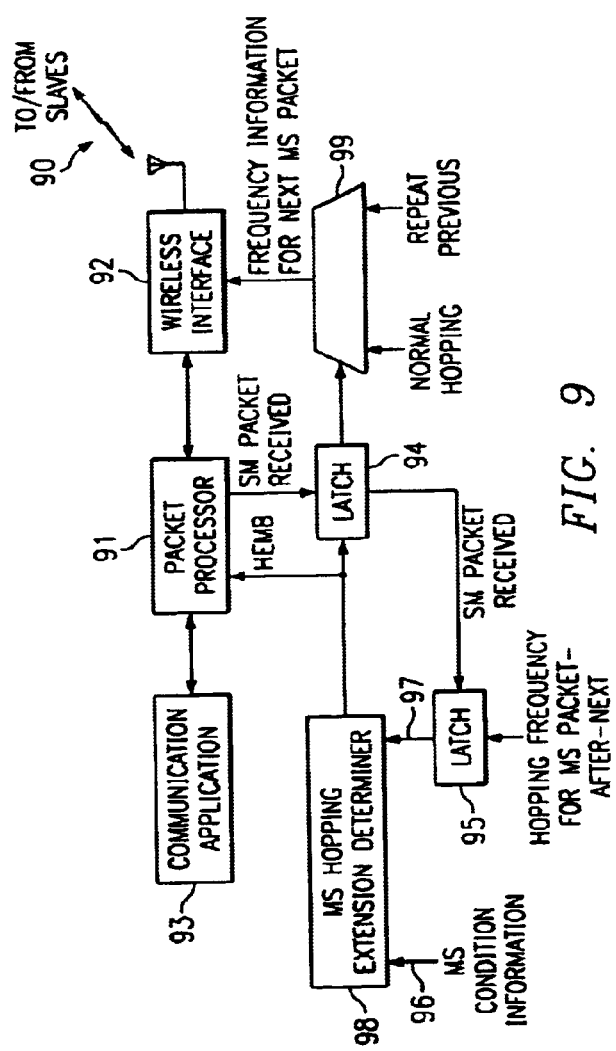
FIG. 9 diagrammatically illustrates exemplary embodiments of the master device of FIG. 8.

FIG. 9 diagrammatically illustrates pertinent portions of exemplary embodiments of the master device illustrated in FIG. 8. The master device of FIG. 9 could be provided, for example, in the base unit of a Bluetooth cordless phone system. Other examples of the master device are mentioned above. The master device of FIG. 9 includes a packet processor 91 coupled between a wireless communications interface 92 and a communications application 93. These components can cooperate together in generally the same fashion as described above with respect to the components 41–43 of FIG. 4 and the components 61–63 of FIG. 6 to permit bidirectional packet communications between the master device of FIG. 9 and slave devices (e.g., Bluetooth cordless phones) over wireless communication link 90 (e.g., a Bluetooth radio link). The packet processor 91 receives HEMB as in input, and inserts HEMB in the outgoing master-to-slave packets. Each time that a slave-to-master packet is received, the packet processor 91 outputs a slave-to-master (SM) packet received signal which clocks a latch 94 such that the HEMB transmitted in the most recent master-to-slave packet is latched through to the select input of a selector 99. The output of the selector 99 provides to the wireless interface 92 information indicative of the frequency at which the next master-to-slave packet is to be transmitted. Thus, by operation of the latch 94, the HEMB value that was included in the most recently transmitted master-to-slave packet is used to determine the frequency at which the next master-to-slave packet will be transmitted. If HEMB=0 in the most recently transmitted master-to-slave packet, then the selector 99 will indicate to wireless interface 92 that the normal hop frequency from the normal frequency hopping pattern will be used for transmission of the next master-to-slave packet. On the other hand, if HEMB=1 in the most recently transmitted master-to-slave packet, the selector 99 will indicate to the wireless interface 92 that the frequency at which the most recent master-to-slave packet was transmitted is to be repeated for transmission of the next master-to-slave packet. The selector 99 thus serves as an indicator of the frequency that will be used for transmission of the next master-to-slave packet.

The value of HEMB that will be transmitted in a given master-to-slave packet (and which will determine the frequency at which the next master-to-slave packet will be transmitted) is produced by a master-to-slave (MS) hop extension determiner 98. The determiner 98 includes inputs 96 and 97, and responds to these inputs to determine the value of HEMB. The input 96 receives information indicative of master-to-slave link conditions, for example information indicative of any strong interferers which may be operating on master-to-slave frequencies. Interference information, for example the frequency of interferers produced by a microwave oven, is typically readily available. The input 97 of the determiner 98 is coupled to the output of a latch 95 that is clocked by the SM packet received signal produced by the packet processor 91 when a new slave-to-master packet is received. Thus, the latch 95 is clocked together with the aforementioned latch 94. Consequently, at the same time that the latch 94 is clocked to select (via selector 99) the frequency at which the next master-to-slave packet will be transmitted, the latch 95 is clocked to apply to the input 97 of the determiner 98 information indicative of the normal hopping frequency for the master-to-slave packet-after-next.

Based on the normal hopping frequency for the packet-after-next received at 97, and also based on the master-to-slave link condition information received at 96, the determiner 98 determines the value of HEMB that will be transmitted in the next master-to-slave packet. This value of HEMB is indicative of the frequency at which the master-to-slave packet-after-next will be transmitted. For example, if the information received at 96 indicates that the normal hop frequency for the master-to-slave packet-after-next coincides with a strong interferer, then the determiner 98 outputs HEMB=1, which means that the frequency of the next master-to-slave packet transmission will also be used for the master-to-slave packet transmission-after-next. On the other hand, if the determiner 98 determines that the normal hopping frequency for the packet-after-next does not coincide with a strong interferer, then the determiner 98 outputs HEMB=0, which indicates that the packet-after-next will be transmitted at the normal hopping frequency.

FIG. 10 illustrates exemplary operations which can be performed by the master device of FIG. 9. It is initially determined at 100 whether or not the normal hopping frequency associated with the (j+1)th packet, namely $MS_{j+1}$, is to be avoided, for example due to a conflict with a strong interferer. If the frequency $MS_{j+1}$ is to be avoided, then $HEMB_j$, namely the value of HEMB that will be sent with the jth master-to-slave packet, is set equal to 1 at 102. Otherwise, $HEMB_j$ is set equal to 0 at 103. Thereafter, if $HEMB_{j-1}$, namely the value of HEMB that was sent with the (j−1)th master-to-slave packet, is 0 at 104, then the jth master-to-slave packet is transmitted at 105 on the normal hopping frequency $MS_j$ associated therewith. If $HEMB_{j-1}$ is equal to 1 at 104, then the jth master-to-slave packet is transmitted at 106 on the frequency $MS_{j-1}$, namely the frequency at which the immediately preceding (the (j−1)th) master-to-slave packet was transmitted. After transmission of the jth master-to-slave packet (including $HEMB_j$) at 105 or 106, the jth slave-to-master packet is received at 107 on frequency $SM_j$. At 108, the index j is incremented, and the above-described operations at 100–107 are thereafter repeated.

FIG. 11 diagrammatically illustrates pertinent portions of exemplary embodiments of the slave device illustrated in FIG. 8. The slave device of FIG. 11 could be provided, for example, in a mobile phone unit in a Bluetooth cordless phone system. Other examples of the slave device are mentioned above. The slave device of FIG. 11 includes a packet processor 111 coupled between a wireless communications interface 112 and a communications application 113. These components can cooperate in generally the same fashion as described above with respect to components 41–43, 61–63 and 91–93 of FIGS. 4, 6 and 9 respectively, to permit packet communications to and from a master device (such as shown in FIG. 9) via a suitable wireless communication link 116. When disassembling a received master-to-slave packet, the packet processor 111 outputs HEMB to a selector 118 whose output provides to the wireless interface 112 information indicative of the frequency at which the next master-to-slave packet will be transmitted. If HEMB=0, then the selector 118 indicates that the normal hop frequency will be used for the next master-to-slave packet transmission. On the other hand, if HEMB=1, then the selector 118 indicates that the frequency that was used for the most recent master-to-slave packet transmission will be repeated for the next master-to-slave packet transmission. The selector 118 thus serves as an indicator of the frequency that will be used for transmission of the next master-to-slave packet.

FIG. 12 illustrates exemplary operations which can be performed by the slave device of FIG. 11. The jth master-to-slave packet (including HEMB) is received at 121 on frequency $MS_j$. Thereafter at 122, the jth slave-to-master packet is transmitted on frequency $SM_j$. After incrementing the index j at 123, the value of HEMB is inspected at 128. If HEMB=0, then the jth master-to-slave packet is received at 121 on frequency $MS_j$. Thereafter, the above-described operations at 122, 123 and 128 are repeated. On the other hand, if HEMB=1 at 128, then the jth master-to-slave packet is received at 129 on frequency $MS_{j-1}$, after which the above-described operations at 122, 123 and 128 are repeated.

Figure 13:
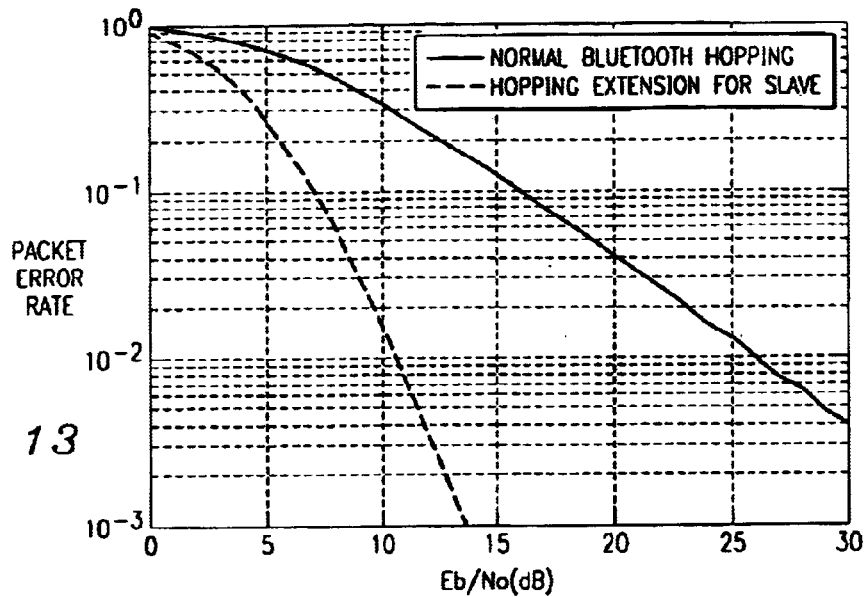
FIG. 13 diagrammatically illustrates simulation results comparing the slave-to-master link performances associated with conventional frequency hopping and with frequency hopping extension in the slave-to-master link.

FIG. 13 illustrates simulation performance curves for conventional Bluetooth HV3 voice (High-quality Voice) over a conventional SCO (Synchronous Connection-Oriented) slave-to-master link and for conventional HV3 voice over an SCO slave-to-master link that employs the HES techniques described above relative to FIGS. 1–7. HES advantageously provides an $E_b/N_O$ gain of 16 dB. Although not shown in FIG. 13, HES can also be used in Bluetooth ACL (Asynchronous Connection-Less) links.

Referring again to FIGS. 4 and 9, the broken lines in the master device of FIG. 4 indicate how the features of the master device of FIG. 9 can be incorporated into the device of FIG. 4, thereby providing a master device which employs both the HES techniques of FIG. 4 and the HEM techniques of FIG. 9. In particular, HEMB is provided to the packet processor 41 by the MS hop extension determiner 98 of FIG. 9, and the information indicative of the frequency for the next master-to-slave packet is provided to the wireless interface 42 by the selector 99 of FIG. 9. Similarly, and referring to FIGS. 5 and 10, the broken lines in FIG. 5 illustrate how selected HEM operations from FIG. 10 can be combined with the HES operations of FIG. 5. In particular, operations can proceed from 59 in FIGS. 5 to 100 in FIG. 10, and thereafter from 106 in FIGS. 10 to 53 in FIG. 5 or from the "0" branch of 104 in FIGS. 10 to 52 in FIG. 5. Of course, both HESB and $HEMB_j$ would be included in the jth MS packet.

Referring again to FIGS. 6 and 11, the broken lines in FIG. 6 indicate how the HEM capabilities of the slave device of FIG. 11 can be combined with the HES capabilities of the slave device of FIG. 6. In particular, the packet processor 61 of FIG. 6 can extract HEMB from received master-to-slave packets and provide HEMB to the select input of the selector 118 of FIG. 11, and the wireless interface 62 of FIG. 6 can receive from the selector 118 of FIG. 11 information indicative of the frequency at which the next master-to-slave packet will be transmitted. Similarly, and referring to FIGS. 7 and 12, the broken lines in FIG. 7 indicate how selected HEM operations from FIG. 12 can be combined with the HES operations of FIG. 7. In particular, operations can proceed from 76 in FIGS. 7 to 128 in FIG. 12, and thereafter from 129 in FIGS. 12 to 73 in FIG. 7 or from the "0" branch of 128 in FIGS. 12 to 72 in FIG. 7.

Figure 14:
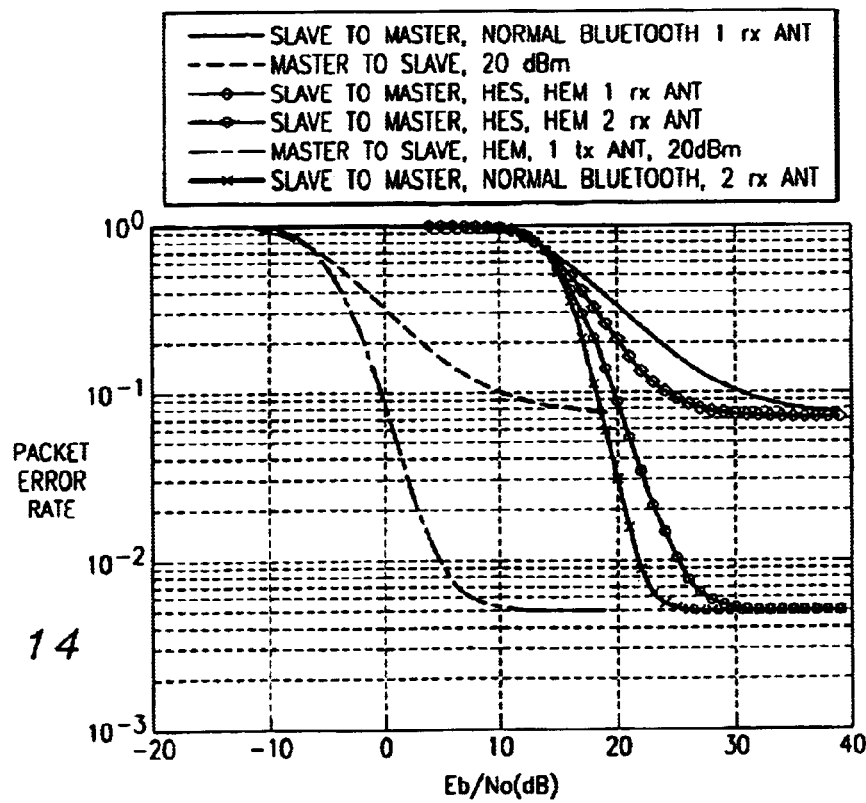
FIG. 14 diagrammatically illustrates simulation results comparing the slave-to-master link performances with conventional frequency hopping and with frequency hopping extension in both the slave-to-master link and the corresponding master-to-slave link.

FIG. 14 illustrates simulation performance curves for two conventional slave-to-master links, one conventional master-to-slave link, one master-to-slave link using the above-described HEM techniques, and two slave-to-master links wherein the above-described HES and HEM techniques are employed together. The curves illustrated represent Bluetooth HV3 voice on SCO links, and they assume microwave oven interference that makes ten frequencies unusable half of the time. The master is assumed to be transmitting at +20 dBm.

Taking the Bluetooth protocol as an example, HESB and HEMB can be included in master-to-slave packets by, for example, substituting them for existing bits or adding them after the header.

It will be evident to workers in the art that the above-described embodiments of FIGS. 1–12 can be readily implemented, for example, by suitable modifications in software, hardware, or a combination of software and hardware, in conventional frequency hopping wireless communication devices such as Bluetooth masters and slaves.

Although exemplary embodiments of the invention are described above in detail, this does not limit the scope of the invention, which can be practiced in a variety of embodiments.

What is claimed is:

1. A method of controlling frequency hopping wireless communications between first and second frequency hopping wireless communication devices, comprising:

determining by the first device that a first frequency of a predetermined frequency hopping pattern associated with transmissions by the second device is better than a second frequency of the predetermined frequency hopping pattern for transmission of a selected communication from the second device to the first device via a wireless communication link, wherein the second frequency is specified by the predetermined frequency hopping pattern for the selected communication and the first frequency is specified by the predetermined frequency hopping pattern for communication from the second device to the first device that most closely precedes in time the selected communication;

responsive to said determining step, instructing the second device by the first device via the wireless communication link to deviate from the predetermined frequency hopping pattern and use the first frequency for transmission of the selected communication instead of the second frequency; and responsive to said instructing step, transmitting the selected communication on the first frequency by the second device via the wireless communication link.

2. The method of claim 1, wherein said determining step includes considering first channel quality information associated with the first frequency and second channel quality information associated with the second frequency.

3. The method of claim 2, wherein the first channel quality information and the second channel quality information include information indicative of signal-to-noise plus interference ratios respectively associated with transmissions on the first and second frequencies.

4. The method of claim 1, wherein said determining step includes determining that the second frequency is fading.

5. The method of claim 1, wherein said determining step includes considering sync word correlation information associated with transmissions on the first and second frequencies.

6. The method of claim 1, wherein said determining step includes considering packet error information associated with transmissions on the first and second frequencies.

7. The method of claim 1, wherein said first and second devices are, respectively, Bluetooth master and slave devices.

8. The method of claim 1, including determining by the first device that a third frequency of a further frequency hopping pattern associated with transmissions by the first device is better than a fourth frequency of the further frequency hopping pattern for transmission of a further selected communication from the first device to the second device via the wireless communication link, wherein the fourth frequency is specified by the further frequency hopping pattern for the further selected communication and the third frequency is specified by the further frequency hopping pattern for communication from the first device to the second device that most closely precedes the further selected communication, and, responsive to said determining by the first device that a third frequency of a further frequency hopping pattern associated with transmissions by the first device is better than a fourth frequency, informing the second device by the first device via the wireless communication link that the first device will deviate from the further frequency hopping pattern and use the third frequency for transmission of the further selected communication instead of the fourth frequency and, responsive to said informing step, receiving by the second device the further selected communication from the wireless communication link on the third frequency.

9. A method of controlling frequency hopping wireless communications between first and second frequency hopping wireless communication devices, comprising:

determining by the first device that a first frequency of a predetermined frequency hopping pattern associated with transmissions by the first device is better than a second frequency of the predetermined frequency hopping pattern for transmission of a selected communication from the first device to the second device via a wireless communication link, wherein the second frequency is specified by the predetermined frequency hopping pattern for the selected communication and the first frequency is specified by the predetermined frequency hopping pattern for communication from the first device to the second device that most closely precedes in time the selected communication;

responsive to said determining step, using said most closely preceding communication and the first frequency by the first device to inform the second device via the wireless communication link that the first device will deviate from its predetermined frequency hopping pattern and use the first frequency for transmission of the selected communication instead of the second frequency; and responsive to said using step, receiving the selected communication by the second device via the wireless communication link on the first frequency.

10. The method of claim 9, wherein said determining stop includes considering information indicative of potential interference at the first frequency and at the second frequency.

11. The method of claim 10, wherein said determining step includes determining that the potential interference is at the second frequency.

12. The method of claim 9, wherein said first and second devices are, respectively, Bluetooth master and slave devices.

13. A frequency hopping wireless communication apparatus, comprising:

a determiner for determining whether a first frequency of a predetermined frequency hopping pattern associated with transmissions by a further frequency hopping wireless communication apparatus is better than a second frequency of the predetermined frequency hopping pattern for receiving a selected communication transmitted by the further apparatus, wherein the second frequency is specified by the predetermined frequency hopping pattern for the selected communication and the first frequency is specified by the predetermined frequency hopping pattern for communication from the further apparatus to said apparatus that most closely precedes in time the selected communication; and a wireless communication interface coupled to said determiner, and responsive to an indication from said determiner that the first frequency is better than the second frequency, for instructing the further apparatus via a wireless communication link to deviate from the predetermined frequency hopping pattern and use the first frequency for transmission of the selected communication instead of the second frequency.

14. The apparatus of claim 13, wherein the apparatus is provided as a Bluetooth master device.

15. The apparatus of claim 13, wherein the apparatus is provided in a base unit of a cordless telephone system.

16. A frequency hopping wireless communication apparatus, comprising:

a wireless communication interface for receiving from a further frequency hopping wireless communication apparatus via a wireless communication link an indication that a first frequency of a predetermined frequency hopping pattern associated with transmissions by said apparatus is better than a second frequency of the predetermined frequency hopping pattern for transmission of a selected communication from said apparatus to the further apparatus via the wireless communication lint, wherein the second frequency is specified by the predetermined frequency hopping pattern for the selected communication and the first frequency is specified by the predetermined frequency hopping pattern for communication from said apparatus to the further apparatus that most closely precedes in time the selected communication; and an indicator coupled to said wireless communication interface and responsive to said indication for informing said wireless communication interface that said apparatus will deviate from the predetermined frequency hopping pattern in order to use the first frequency for transmission of the selected communication instead of the second frequency.

17. The apparatus of claim 16, wherein the apparatus is provided as a Bluetooth slave device.

18. The apparatus of claim 16, wherein the apparatus is provided in a cordless telephone.

19. A frequency hopping wireless communication apparatus, comprising:

a determiner for determining whether a first frequency of a predetermined frequency hopping pattern associated with transmissions by said apparatus is better than a second frequency of the predetermined frequency hopping pattern for transmitting a selected communication to a further frequency hopping wireless communication apparatus via a wireless communication link, wherein the second frequency is specified by the predetermined frequency hopping pattern for the selected communication and the first frequency is specified by the predetermined frequency hopping pattern for communication from said apparatus to the further apparatus that most closely precedes in time the selected communication; and a wireless communication interface coupled to said determiner, and responsive to an indication from said determiner that the first frequency is better than the second frequency, for using said most closely preceding communication and the first frequency to inform the further apparatus via the wireless communication link that said apparatus will deviate from the predetermined frequency hopping pattern and use the first frequency for transmission of the selected communication instead of the second frequency.

20. The apparatus of claim 19, wherein the apparatus is provided as a Bluetooth master device.

21. The apparatus of claim 19, wherein the apparatus is provided in a base unit of a cordless telephone system.

22. The apparatus of claim 19, including a further determiner for determining whether a third frequency of a further frequency hopping pattern associated with transmissions by the further apparatus is better than a fourth frequency of the further frequency hopping pattern for receiving a further selected communication transmitted by the further apparatus, wherein the fourth frequency is specified by the further frequency hopping pattern for the further selected communication from the third frequency is specified by the further frequency hopping pattern for communication from the further apparatus to said apparatus that most closely precedes the further selected communication, said wireless communication interface coupled to said further determiner and responsive to a further indication from said further determiner that the third frequency is better than the fourth frequency for instructing the further apparatus via the wireless communication link to deviate from the further frequency hopping pattern and use the third frequency for transmission of the further selected communication instead of the fourth frequency.

23. A frequency hopping wireless communication apparatus, comprising:

a wireless communication interface for receiving from a further frequency hopping wireless communication apparatus via a wireless communication link a first communication on a first frequency specified for said first communication by a predetermined frequency hopping pattern associated with transmissions by the further apparatus, said first communication including an indication that said first frequency is better than a second frequency of the predetermined frequency hopping pattern for transmitting via the wireless communication link a second communication from the further apparatus to said apparatus that most closely follows in time said first communication, wherein the second frequency is specified by the predetermined frequency hopping pattern for the second communication; and an indicator coupled to said wireless communication interface and responsive to said indication for informing said wireless communication interface that said apparatus will deviate from the predetermined frequency hopping pattern and the first frequency will be used to receive the second communication instead of the second frequency.

24. The apparatus of claim 23, wherein the apparatus is provided as a Bluetooth slave device.

25. The apparatus of claim 23, wherein the apparatus is provided in a cordless telephone.

26. The apparatus of claim 23, wherein said wireless communication interface is further for receiving from the further apparatus via the wireless communication link a further indication that a third frequency of a frequency hopping pattern associated with transmissions by said apparatus is better than a fourth frequency of the frequency hopping pattern for transmission of a selected communication from said apparatus to the further apparatus via the wireless communication link, wherein the fourth frequency is specified by the further frequency hopping pattern for the selected communication and the third frequency is specified by the further frequency hopping pattern for communication from said apparatus to the further apparatus that most closely precedes the selected communication, and further including a further indicator coupled to said wireless communication interface and responsive to said further indication for informing said wireless communication interface that said apparatus will deviate from the further frequency hopping pattern in order to use the third frequency for transmission of the selected communication instead of the fourth frequency.

* * * * *